Patented June 29, 1937

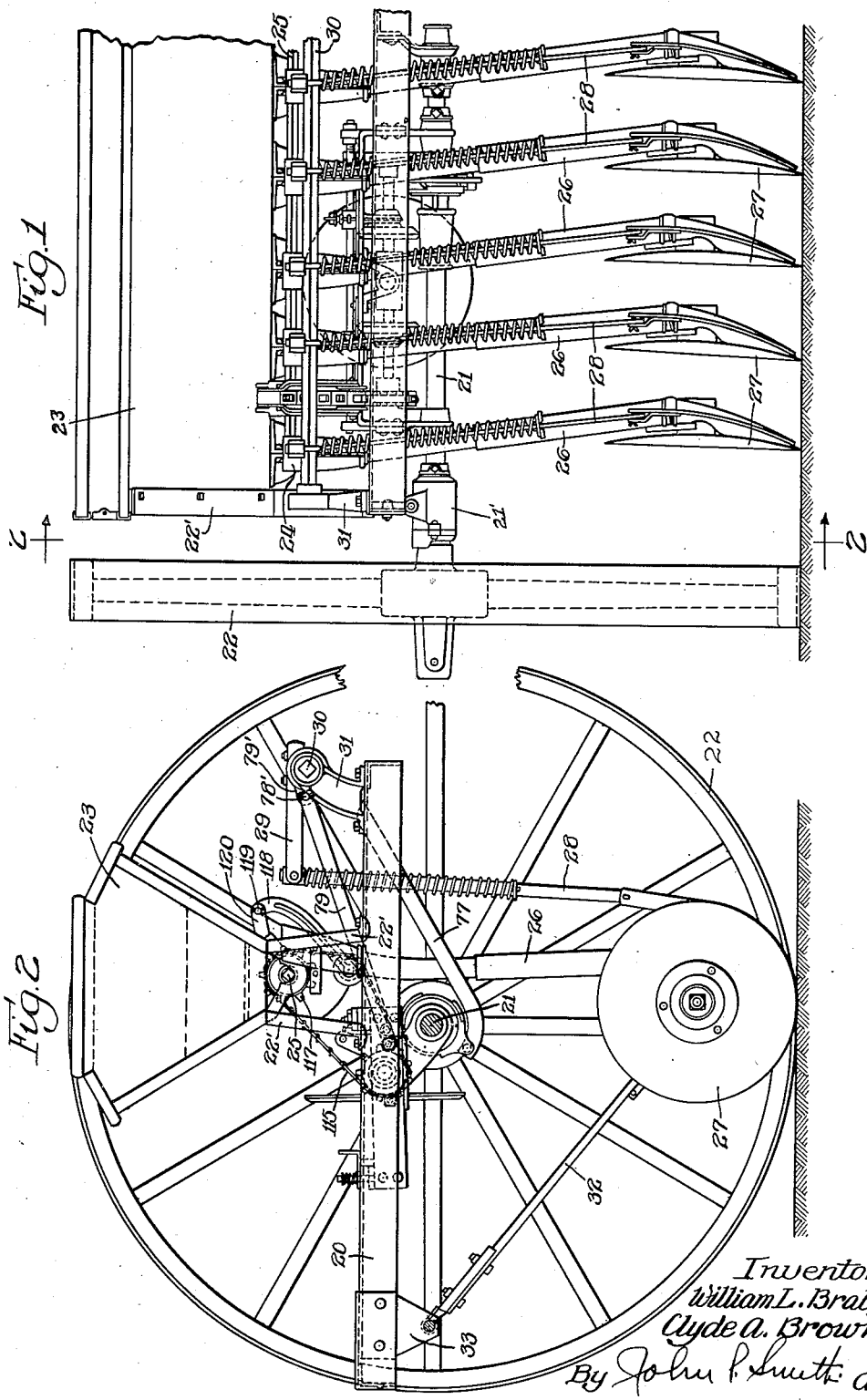

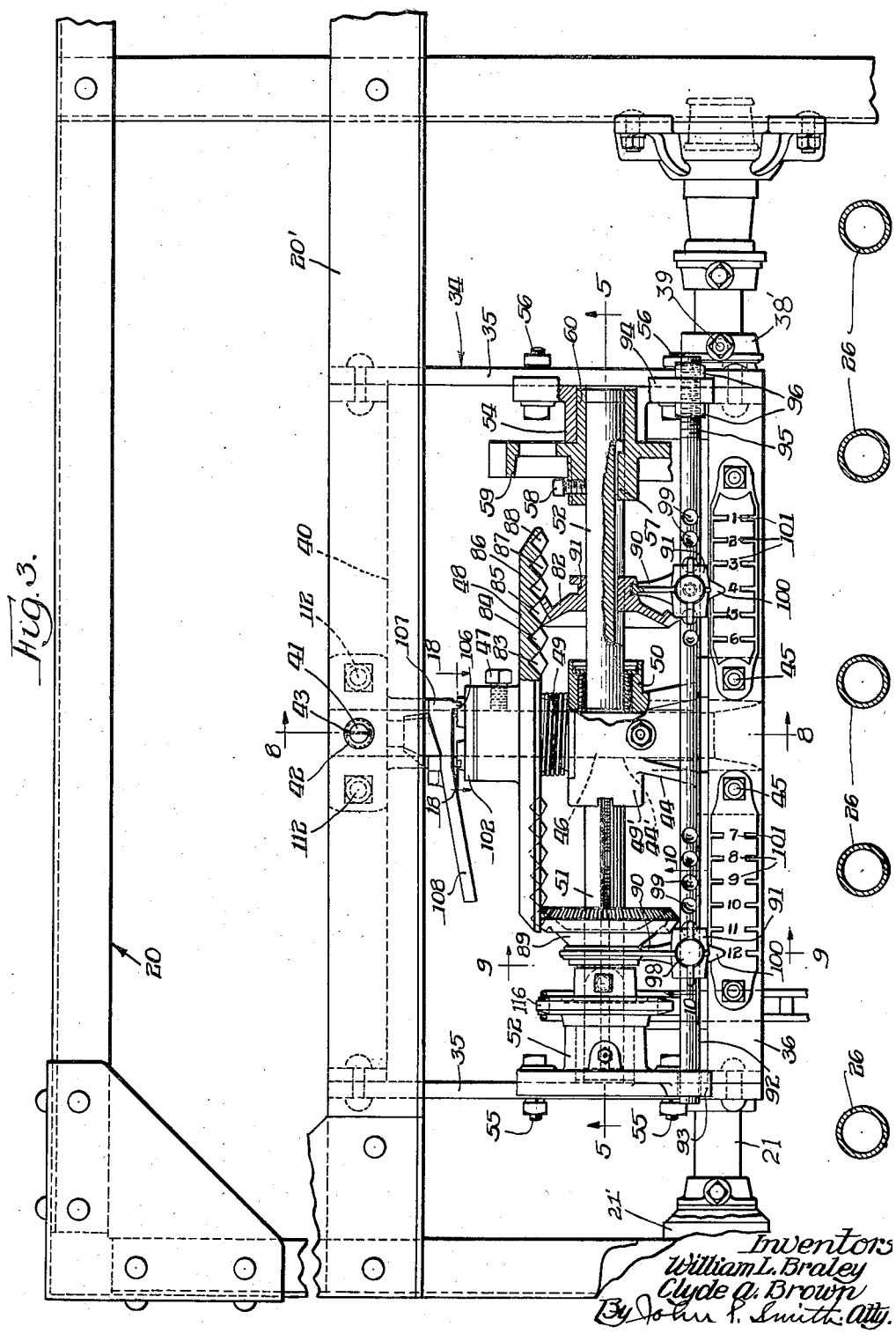

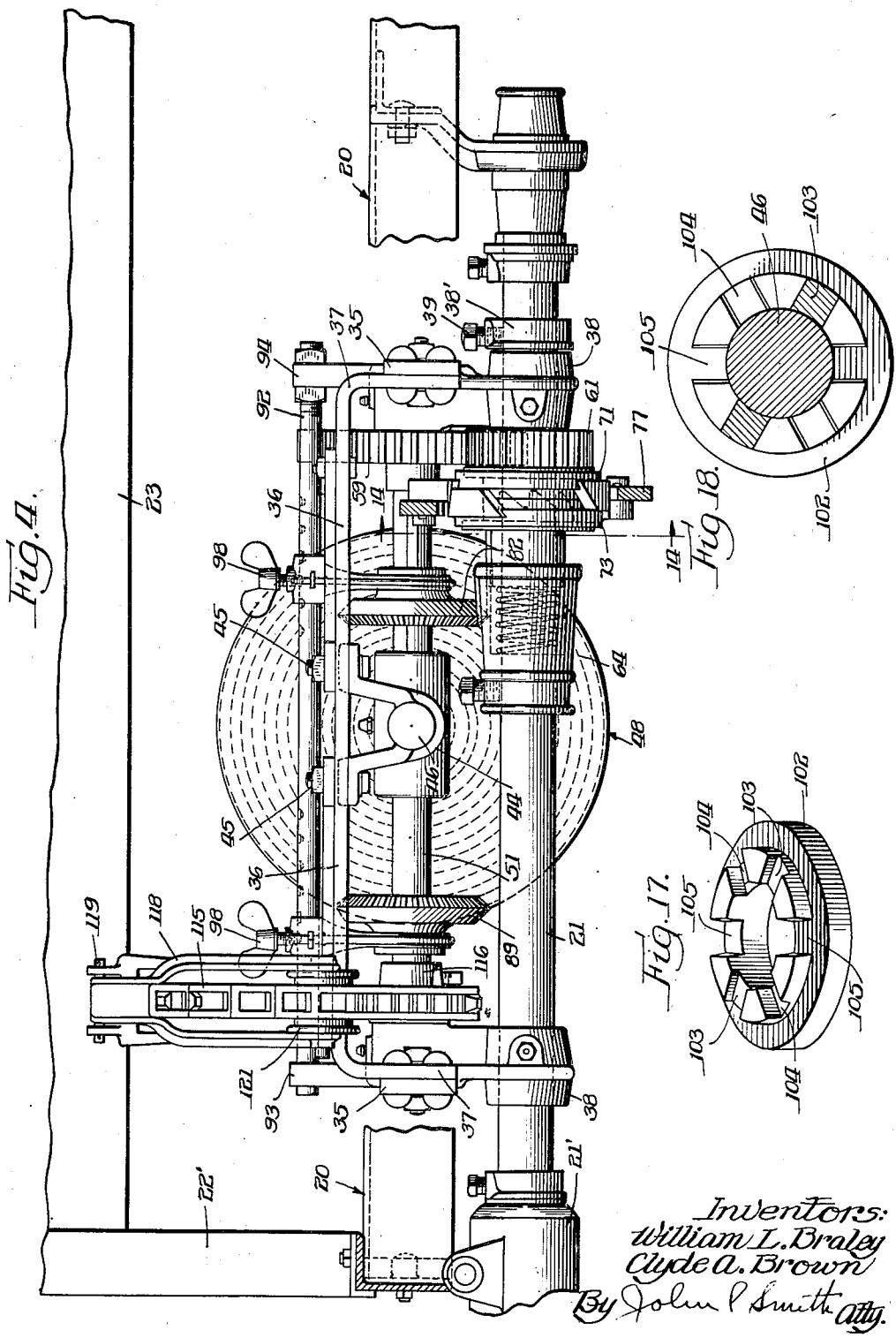

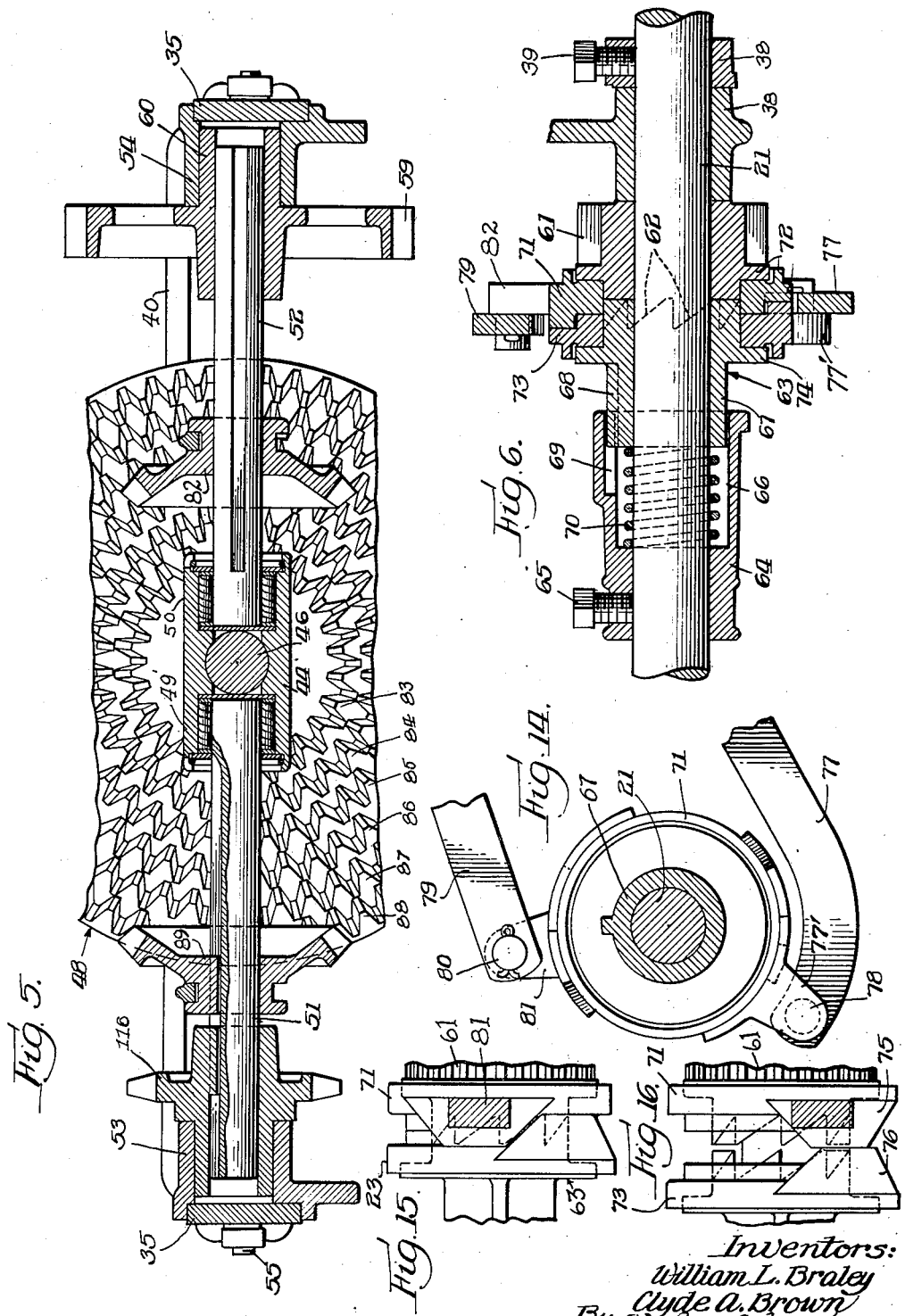

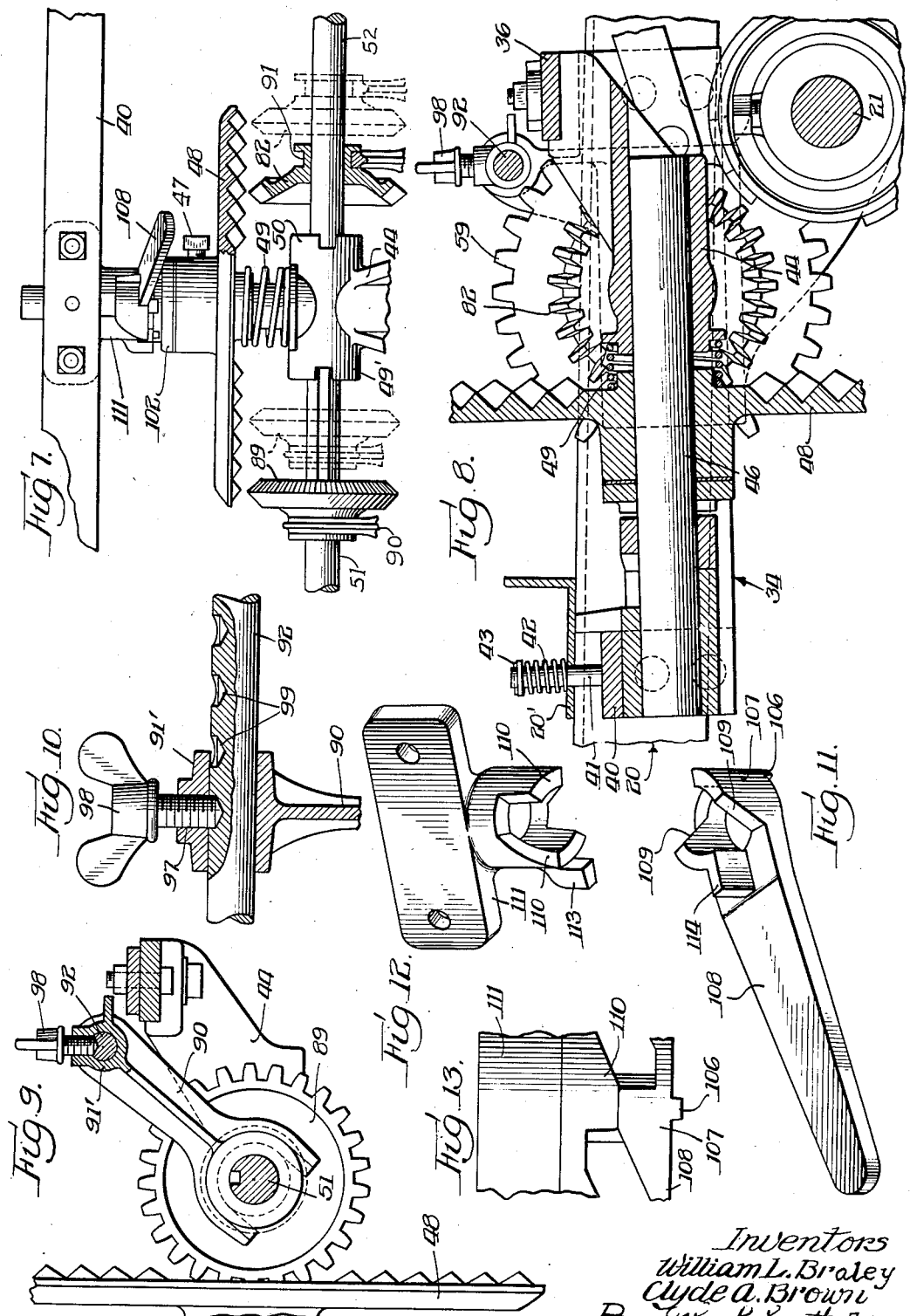

2,085,182

UNITED STATES PATENT OFFICE 2,085,182

VARIABLE SPEED MECHANISM FOR GRAIN DRILLS AND THE LIKE

William L. Braley and Clyde A. Brown, Springfield, Ohio, assignors to Oliver Farm Equipment Company, a corporation of Delaware Application July 28, 1933, Serial No. 682,576

5 Claims. (Cl. 74—348)

The present invention is directed generally to seeding machines and the like, but more particularly to a novel and improved variable speed driving mechanism in which a multiplicity of speed changes for seed distributors is accomplished with a minimum number of gears.

The primary object of the present invention is to provide a novel and improved variable speed driving mechanism for seeding machines and the like which is sufficiently compact in form so that the same can be arranged to operate in the limited space usually available in the conventional form of seeding machines and yet be of sufficiently increased size, with larger wearing surfaces than those heretofore used in order to withstand the wear and stress to which the driving mechanism of such machines are subjected in sowing large acreages.

A further object of the present invention is to provide a novel and improved form of variable speed driving mechanism in which, for example, a speed disc having six rows of teeth working in combination with a driving and driven pinion, permits thirty-six speed changes to be obtained.

A further object of the invention is to provide a novel and improved variable speed driving mechanism for seeding machines and the like, in which novel and efficient means are provided to compensate for wear at the base of the speed disc hub so that pinions can be maintained or adjusted in proper meshing relation with the teeth of the speed disc when assembled or after wear has taken place.

A still further object of the invention is to provide a novel and improved variable speed drive mechanism for seeding machines and the like, in which means is provided in the form of an adjustable thrust-collar cooperating with a shifter lever so that the position of the speed disc in relation to the shaft may be changed as desired, to correct faulty meshing of the pinion teeth.

A further object of the invention is to provide a novel and improved variable speed drive mechanism for seeding machines and the like, in which the driving mechanism is mounted on a supplemental frame and supported on a three point suspension in such a way that the driving mechanism is not affected by the torsional twists and strains to which the main frame of the seeding machine is subjected when passing over rough or uneven ground.

These and other objects are accomplished by providing a construction and an arrangement of the various parts in the manner hereinafter described and particularly pointed out in the appended claims.

Referring to the drawings:

Fig. 1 is a rear elevational view of a fragmentary portion of a conventional form of grain drill or seeding machine having our improvement embodied therein;

Fig. 2 is a side elevational view of the same;

Fig. 3 is an enlarged fragmentary top plan view of a portion of the main frame of a grain drill having our improved variable speed drive mechanism mounted therein;

Fig. 4 is a front elevational view of our improved variable speed drive mechanism;

Fig. 5 is a cross sectional view taken on the line 5—5 in Fig. 3;

Fig. 6 is an enlarged fragmentary view showing the clutch mechanism on the axle;

Fig. 7 is a fragmentary top plan view showing the manner in which the multiple rows of teeth on the speed disc is disengaged from meshing relation with the pinions in order to adjust the pinions for securing different speeds;

Fig. 8 is a cross sectional view taken on the line 8—8 in Fig. 3;

Fig. 9 is a cross sectional view taken on the line 9—9 in Fig. 3;

Fig. 10 is a cross sectional view taken on the line 10—10 in Fig. 3;

Fig. 11 is a perspective view of an operating shifting lever which permits the disengagement of the disc with the operation pinions;

Fig. 12 is a perspective view of the bracket which has coacting portions which cooperate with the lever;

Fig. 13 is a diagrammatic view of the camming portions of the lever and the bracket;

Fig. 14 is a cross sectional view taken on the line 14—14 in Fig. 4;

Fig. 15 is a fragmentary side elevational view of the clutch mechanism in engaged or operative position;

Fig. 16 is a similar view showing the clutch members disengaged;

Fig. 17 is a perspective view of the adjustable thrust collar; and

Fig. 18 is a cross sectional view taken on the line 18—18 in Fig. 3.

In illustrating one form of our invention, we have shown the same in connection with a conventional form of grain drill or seeding machine, only a fragmentary portion of which is shown in Figs. 1 and 2 of the drawings. This grain drill comprises the usual main frame, generally indicated by the reference character 20, which is supported on a main axle 21 by bearings 21' and two outside driving and supporting wheels 22, only one of which is shown in the drawings. Supported above and on the main frame 20 by the usual supporting brackets 22', and extending between the two supporting wheels 22, is a seed hopper, generally indicated by the reference character 23, of any conventional form. Located at regular spaced apart intervals and operatively connected to the seed hopper 23 are seed distributors, generally indicated by the reference characters 24, which in turn, are operatively driven by a seed shaft 25. This shaft in turn, derives its power from our improved variable speed drive mechanism hereinafter described. Connected to each of the seed distributors 24 are conductor tubes 26 which conduct the seed to the usual furrow openers, generally indicated by the reference character 27. The furrow openers are connected by means of connecting rods 28, to forwardly extending cranks 29, which in turn, are secured to a square shaft 30 having its opposite ends mounted in suitable bearing brackets 31 secured to the main frame 20. Each of the furrow openers is also provided with diagonally extending draft members 32 which have their forward ends connected to brackets 33 secured to the forward portion of the main frame 20. Of course, it will be understood that the shaft 30 is provided with the usual manually operable lever (not shown) for raising and lowering in unison all of the furrow openers with respect to the ground. The description of the grain drill thus far described is essentially the construction of the conventional drill.

Our improved variable speed driving mechanism is mounted on a supplemental frame and connected by a three point suspension with the main frame of the drill. This supplemental frame is generally indicated by the reference character 34, and comprises two longitudinally extending side frame members 35. Connected to the rearward ends of the supplemental frame members 35 is a rear transverse frame member 36 which has its outer ends bent downwardly at right angles, as shown at 37, and secured at their lower ends to the side frame members 35 and bearing brackets 38. These bearing brackets 38 are journaled on the axle shaft 21 and prevented from longitudinal displacement on the shaft by collar 38' and set screw 39. These bearing brackets form two of the three point suspension of the supplemental frame 34. The forward ends of the side frame members 35 are connected by a transverse frame member 40 which in turn, is connected by means of a bolt 41, extending through an aperture in the central portion of the forward supplemental frame member 40 and through a registering aperture in one of the transverse main frame members 20'. Encircling this bolt 41 is a spring 42. The spring 42 is prevented from displacement on the bolt 41 by a washer and cotter pin 43. This connection of the frame 34 by means of a bolt 41 to the main frame 20, together with the two bearing brackets 38 on the axle 21 form the three point suspension of the supplemental frame on which the variable speed drive mechanism is mounted. This three point suspended supplemental frame permits the maintaining of a transmission and axle shafts in alignment as well as the meshing relation of the gears, in such a way as not to affect the driving mechanism regardless of the torsional twists and strain placed on the main frame of the seeding machine when passing over rough or uneven ground.

Our improved variable speed drive mechanism in which the speed disc having only six rows of teeth working in combination with a driving and driven pinion, permitting thirty-six changes of speed and occupying a minimum amount of space in the limited space afforded for this purpose in the conventional grain drill, comprises a bearing bracket, generally indicated by the reference character 44, which is secured to the underside of the rear transverse supplemental frame member 36 by means of bolts 45. See Figs. 3, 4 and 5. Journaled and slidably mounted in a longitudinal bore 44' in the bearing bracket 44 is a shaft 46. Secured to the shaft 46 by means of a set screw 47 forwardly of the bracket 44 is our improved form of variable speed disc, generally indicated by the reference character 48. Surrounding the shaft 46 between the bearing bracket 44 and the variable speed disc 48 is an extension spring 49. This spring is arranged to actuate or move the shaft 46 and the disc 48 forwardly with respect to the bearing 44 so as to disengage the disc 48 from meshing relation with the pinions and permit an adjustment of the meshing and speed relation between the pinions and the disc in the manner hereinafter described. Formed integrally with the bearing brackets 44 and extending oppositely and laterally with respect thereto, are bearing bosses 49' and 50 in which are journaled respectively, shafts 51 and 52. The outer ends of each of the shafts 51 and 52 are journaled in bearing brackets 53 and 54, which in turn, are secured by means of bolts 55 and 56 to the opposite sides of the side frame members 35 of the supplemental frame 34. Secured to one end of the shaft 52 by means of a key 57 and a set screw 58, adjacent the bearings 54, is a gear 59. Formed integrally with a gear 59 is a laterally projecting bearing barrel 60 which forms a bushing between the shaft 52 and the bearing bracket 54. See Fig. 3. The gear 59 is operatively driven by a pinion 61 which is loosely mounted on the axle 21. Formed integrally with and extending inwardly from the pinion 61 are clutch teeth 62, which are adapted to engage a continuously rotating clutch member 63 having similar complementary clutch teeth. The clutch member 63 is slidably adjustable on the axle 21 and revolves therewith through the medium of a collar 64 secured to the shaft 21 by a set screw 65. The collar 64 is provided with a longitudinally extending recess 66 which is adapted to telescopically receive the sleeve portion 67 of the continuously rotating clutch member 63. The clutch member 63 is operatively driven by means of a key 68 which slidably engages a key-way 69 formed on one side of the collar 64. The clutch member 63 is normally pressed into engagement with the clutch teeth 62 of the pinion 61 by a pressure spring 70 which is seated in the recess 66 of the collar 64 and surrounds the shaft so as to engage one end of the clutch member 63 as clearly illustrated in Fig. 6 of the drawings. The clutch member 63 is disengaged from the clutch teeth of the pinion 61 by a stationary camming ring 71 which engages an annular flange 72 formed integrally with the pinion 61 and a relatively movable camming ring 73 which in turn engages a circular flange 74 formed integrally with the clutch member 63. Each of the camming rings 71 and 72 are provided with oppositely disposed pairs of camming lugs 75 and 76 respectively, which co-act to disengage the clutch member 63 and the clutch teeth 62 of the pinion 61. The camming ring 71 is held in relatively stationary position by means of a link 77 which has its forward end connected, as shown at 78, to a downwardly projecting ear 77' formed integrally with the ring 71. The rear end of the connecting link 77 is connected to a transverse frame member of the main frame 20. See Figs. 2 and 14. The movable camming ring 73 is actuated through a connection 79 which has its forward end pivotally connected, as shown at 80, to an ear 81 formed integrally with the movable camming ring 73. The rear end of the link 79 is pivotally connected at 78' to a crank 79', which in turn, is secured to the shaft 30. From the above description it will be obvious that when the furrow openers 27 are lowered to their ground engaging position by the manipulation of the hand lever (not shown) connected to the shaft 30, the crank 79' and connection 79 will be actuated to operatively connect the variable speed drive mechanism with the traction wheels and axle 21 of the grain drill by moving the camming ring 73 from the position shown in Fig. 16 where the camming members 76 and 75 disengage the clutch members to clutch engaging position shown in Fig. 15. In this connection it will be noted that the spring 70 urges the clutch member 63 into clutching engagement with the clutch portion of the pinion 61 as clearly shown in Fig. 6 of the drawings.

Splined to the shaft 52 is a driving beveled gear or pinion 82 which is adapted to be adjusted longitudinally with respect to the shaft 52 for engaging any one of the six rows of teeth beginning from the center portion or inner row 83, second row 84, third row 85, fourth row 86, fifth row 87 and the outer row 88 formed on one face of the variable speed disc 48. Splined to the other shaft 51 and adapted to be adjusted longitudinally with respect thereto is a driven beveled gear or pinion 89, which similarly may be adjusted to engage any one of the six rows of teeth on the other side of the axis of the variable speed disc 48. The driving beveled pinion 82 and driven beveled pinion 89 are adjustably locked in the various positions by the operator, who has the choice of thirty-six speeds with six rows of teeth in the variable speed disc 48, by means of forks 90 which are adapted to engage annular recesses 91 in each of these pinions. The upper ends of these fork members 90 are provided with bearings or barrel portions 91' and are slidably mounted on a shaft 92. One end of this shaft is supported in the upwardly extending ear 93 formed integrally with the bearing bracket 53 and the other end of the shaft is mounted in a similar ear 94 formed integrally with the bearing bracket 54. One end of this shaft is provided with a threaded portion, as shown at 95, and engages a threaded aperture in the ear 94 for longitudinally adjusting this shaft with respect to the supplemental frame 34. The shaft is securely locked in position after once it is set by locking nuts 96. Each of the bearing barrels 91 of the forks 90 are provided with vertically extending threaded apertures, as shown at 97, and receive in threaded engagement therewith, pointed threaded thumb screws 98, the lower ends of which, are adapted to engage regularly spaced apart sockets 99, formed to the upper surface of the shaft 92 for locking the beveled pinions 82 and 89 in various positions, so as to secure proper meshing relation with the various rows of teeth in the variable speed disc 48. Each of the forks 90 are provided with rearwardly extending pointers 100 which indicates the position of the pinions through the means of numerals indicated at 101 corresponding to the rows of teeth on the variable speed disc 48.

Another important feature of our invention consists of a novel means to compensate for wear at the hub or base of the variable speed disc so that the beveled gears or pinions may be maintained in proper meshing relation with the teeth of the disc. Means is also provided for permitting a withdrawal of the disc from meshing relation with the pinions so as to effect an adjustment of the pinions when a change of speed is desired. This novel means comprises an adjustable thrust collar 102 (see Figs. 3, 4, 7, 17 and 18) mounted on the shaft 46 and abutting the forward end of the hub of the variable speed disc 48. One face of this collar is provided with a plurality of equally spaced apart notches around the circular face thereof, and arranged in pairs, as shown at 103, 104 and 105. Each pair of notches being of successively greater depth and arranged to receive a single complementary pair of opposite lugs 106 formed on the hub portion 107 of an operating hand lever 108. The hub 107 of the lever 108 is provided with two oppositely disposed camming projections 109 which are complementary to and co-act with two oppositely disposed camming projections 110 of a bracket 111 which is secured to the supplemental frame member 49 by means of bolts 112. These camming portions form substantially a bearing sleeve, through which the rear end of the shaft 46 extends. The lever 108 is mounted on the shaft 46, as clearly shown in Figs. 3, 11, 12 and 13. Formed integrally with one of the camming portions 110 of the bracket 111 is a stop 113 which is adapted to engage the lug 114 formed on the lever 108 for limiting the movement of the lever at one point or in the position shown in Fig. 13.

From the above description it will be readily seen that as the lever 108 is actuated from the position shown in Fig. 3 to the position shown in Fig. 7, the camming lugs 109 coincide or interfit into the recesses between the camming lugs 110 of the bracket 111 and that by reason of the spring 49 positioned between the bracket 44 and the rear surface of the variable speed disc 48, pushes or urges the disc with its shaft 46 forwardly thereby disengaging the disc 48 from meshing relation with the pinions 82 and 89 respectively. When the disc is in this disengaged position, the pinions 82 and 89 may then be shifted to the various positions in the manner indicated in Fig. 7 and the forks 90 may then be secured in position by the thumb nuts engaging the recesses 99 in the shaft 92 after which the lever 108 may be revolved from the position shown in Fig. 7 to that shown in Fig. 3 for again meshing the speed disc with the two pinions. In this connection it will also be observed that should the hub of the variable speed disc become worn or should the teeth in the disc become worn and a closer meshing relation between the teeth of the disc and the pinion desired, the adjustable collar 102 may be revolved so that the lugs 106 on the lever 108 will engage a pair of notches either 103 or 104 which are of lesser depth to take up the wear and correct the operative meshing relationship between the variable speed disc and its cooperating pinions. The power is transmitted from the driven shaft 51 to the distributor or seeding shaft 25 by a drive chain 115 which is trained about a sprocket 116 secured to the shaft 51 and about a sprocket 117 secured to the shaft 25. The chain is provided with the usual chain tightener arm 118 pivoted at 119 to a bracket 120 secured to the hopper. The free end of the arm is provided with the usual chain tightener roller 121 which engages an inner lap of the chain 115.

Summarizing the operation of our improved variable speed drive mechanism for grain drills and the like machine, it is obvious that we have provided a simple, compact and efficient drive mechanism supported at two points on the axle shaft and by a third point with a resilient spring to the main frame of the drill so that the shafts of this drive or transmission mechanism always maintain their alignment with respect to the axle and that by reason of this arrangement of three point suspension supplemental frame, the meshing relation of the variable speed disc with its cooperating pinions may be always maintained regardless of the torsional twist or strain on the main frame of the drill, caused by the travel of the drill over rough or uneven ground. It will be further observed that by the arrangement of six rows of teeth on the variable speed disc 48 with which the cooperating pinions 82 and 89 may each be respectively positioned to engage any set of teeth of the six rows on either side of the center of the disc so as to provide a wide range of adjustment of speed, namely, thirty-six different speeds, yet the arrangement is sufficiently compact to fit in the limited space provided in the conventional form of grain drill. The adjustment of these pinions on their respective shafts is accomplished as hereinbefore described by operating the hand lever 108 from the position shown in Fig. 3 to that shown in Fig. 6. When actuated in this latter position, the camming lugs 109 seat themselves in the recesses between the camming lugs 110 on the bracket 111 at which time the spring 49 located between the bracket 44 and the variable speed disc 48 urges the speed disc together with its shaft 46 forwardly to disengage the disc 48 from its meshing relation with each of the pinions 82 and 89. When in this position, the pinions may be adjusted longitudinally of their shafts and locked in these positions by the thumb screws 98 in the recesses formed in the supporting shaft 92. In this connection it will also be noted that we have provided efficient means to compensate for wear at the hub of the variable speed disc so as to maintain proper meshing relation between the disc and pinions by the adjustable thrust collar 102 which is provided with several notches arranged in pairs equal distances around the circular base thereof with each pair of notches thereof being of successively greater depth so that by an adjustment of the washer rotatably with respect to the pair of lugs on the lever 108 in the different notches provided in the collar, any undue wear may be taken up by this arrangement.

It will also be noted that the clutch mechanism, which operatively connects the drive axle 21 with the variable speed transmission mechanism, and particularly the link 79 connecting the movable camming ring 73 with the crank 79' of the shaft 30, will be actuated upon raising the furrow openers 27 by the manipulation of this shaft to automatically disconnect the driving power of the axle for stopping the flow of seed when turning at the end of the field or for other reasons. The reverse action takes place when the furrow openers are lowered.

While in the above specification we have described one embodiment which our invention may assume in practice, it will of course be understood that the same is capable of modification and that modification may be made without departing from the spirit and scope of the invention as expressed in the following claims:

What we claim as our invention and desire to secure by Letters Patent is:

1. A variable speed drive mechanism for grain drills and the like machine comprising a frame, a shaft mounted on said frame, a variable speed disc secured to and longitudinally adjusted with said shaft, said disc having a plurality of rows of teeth on one face thereof, a drive shaft mounted on said frame, a drive pinion splined to said shaft, a driven shaft mounted on said frame, a driven pinion splined to said shaft, a spring mounted on said first named shaft normally actuating said disc and shaft forwardly with respect to said pinions, a bracket mounted on said frame having camming members formed thereon, a hand operating lever rotatable on said first named shaft having camming surfaces engageable with said camming members, said lever being operatively related to said disc whereby on the manipulation of said lever said disc is actuated to or from meshing relation with said pinions, and a thrust collar mounted on said shaft having graduated adjustments for compensating for wear occurring between said discs and said pinions.

2. A variable speed drive mechanism for grain drills and the like machine comprising a frame, a shaft mounted on said frame, a variable speed disc secured to said shaft having a plurality of rows of teeth on one face thereof, a spring mounted on said shaft and normally urging said disc and shaft forwardly with respect to said frame, a drive shaft mounted on said frame, a drive pinion splined to said shaft and adapted to engage any one of the rows of teeth on said disc on one side of the axis thereof, a lever pivoted on said first named shaft and operatively related to said disc, said lever adapted to coact with camming members on said frame for controlling the position of said disc with respect to said pinions, and an adjustable collar mounted on said shaft and engageable with said lever for compensating for the wear occurring between said disc and said pinions.

3. A variable speed drive mechanism for grain drills and the like machine comprising a frame, a shaft mounted on said frame, a variable speed disc secured to said shaft and having a plurality of rows of teeth on one face thereof, a drive pinion mounted on said frame and adapted to engage any one of the rows of teeth on said disc on one side of the axis thereof, a driven pinion mounted on said frame and adapted to engage any one of the rows of teeth on said disc on the other side of the axis thereof, a coil spring mounted on said shaft for normally urging said shaft and disc in a direction away from said pinion, an adjustable thrust washer for varying the meshing relation of said disc with respect to said pinions, and a lever pivoted on said shaft and operatively related to said disc for shifting said disc with respect to said pinions.

4. A variable speed drive mechanism for grain drills and the like machine comprising a frame, a shaft mounted on said frame, a variable speed disc secured to said shaft and having a plurality of rows of teeth on one face thereof, a drive pinion mounted on said frame and adapted to engage any one of the rows of teeth on said disc on one side of the axis thereof, a driven pinion mounted on said frame and adapted to engage any one of the rows of teeth on said disc on the other side of the axis thereof, a bracket mounted on said frame forming the forward bearing support for said first named shaft and having a plurality of camming members formed integrally therewith, a lever pivoted on said first named shaft and having co-acting camming members engageable with the camming members of said bracket, said lever operatively related to said disc for controlling the position of said disc with respect to said pinion, said lever having two spaced apart lugs on one face thereof, and an end thrust bearing collar mounted on said shaft having complementary recesses on one face thereof of graduated depth for engaging the lugs on said lever for varying the meshing relation of said disc with respect to said pinions.

5. A variable speed drive mechanism for grain drills and the like machine, comprising a frame, a shaft journaled on said frame, a variable speed disc secured to said shaft having a plurality of rows of teeth on one face thereof, a spring mounted on said shaft and engageable with said disc for urging said disc and shaft forwardly with respect to said frame, a drive shaft journaled on said frame, a drive pinion splined to said shaft, means for adjustably securing said pinion in various positions along said shaft so that said pinion may engage any one of the rows of teeth on said disc on one side of the axis thereof, a driven shaft journaled on said frame in alignment with said last named shaft, a driven pinion splined to said second named shaft for engaging any one of the rows of teeth on said disc on the other side of the axis thereof, a hand operating lever for controlling the position of said disc with respect to said pinions, and an adjustable thrust collar located between said disc and said lever for regulating the meshing relation of said disc with said pinions.

WILLIAM L. BRALEY.
CLYDE A. BROWN.